US009604659B1

(12) United States Patent
Wang

(10) Patent No.: US 9,604,659 B1
(45) Date of Patent: Mar. 28, 2017

(54) FOLDING DEVICE FOR BABY CARRIAGE

(71) Applicant: MIMA INTERNATIONAL HOLDINGS LIMITED, Tortola, VI (US)

(72) Inventor: Kun Wang, Taichung (TW)

(73) Assignee: Mima International Holdings Limited, Tortola (VG)

( * ) Notice: Subject to any disclaimer, the term of this patent is extended or adjusted under 35 U.S.C. 154(b) by 0 days.

(21) Appl. No.: 15/085,300

(22) Filed: Mar. 30, 2016

(51) Int. Cl.
- *B62B 7/06* (2006.01)
- *B62B 9/12* (2006.01)
- *B62B 7/10* (2006.01)

(52) U.S. Cl.
CPC ...................................... *B62B 7/10* (2013.01)

(58) Field of Classification Search
CPC  B62B 7/06; B62B 7/062; B62B 7/064; B62B 9/12
See application file for complete search history.

(56) References Cited

U.S. PATENT DOCUMENTS

| | | | |
|---|---|---|---|
| 8,870,213 B1* | 10/2014 | Xu | B62B 7/08 280/642 |
| 8,985,616 B1* | 3/2015 | Chen | B62B 7/062 280/47.38 |
| 2008/0088116 A1* | 4/2008 | Den Boer | B62B 7/062 280/650 |

* cited by examiner

*Primary Examiner* — Bryan Evans
(74) *Attorney, Agent, or Firm* — Fishman & Associates, LLC.

(57) ABSTRACT

A folding device for a baby carriage has a supporting pole, a folding joint, and a collapsible pole. The supporting pole has two opposite ends. The folding joint is arranged at the supporting pole. The collapsible pole is rotatably mounted on the folding joint. The folding joint has an assembling seat disposed at one of the two opposite ends of the supporting pole and a blocking blade movably mounted in the assembling seat. The collapsible pole has a plug mounted in the plugging hole to prevent the collapsible pole from spinning. When the plug moves out of the plugging hole, the blocking blade can block the plugging hole. The folding device for a baby carriage can prevent children inserting their fingers into the plugging hole and accidentally pinching their fingers.

9 Claims, 9 Drawing Sheets

FOLDING DEVICE FOR BABY CARRIAGE

BACKGROUND OF THE INVENTION

1. Field of the Invention

The present invention relates to a folding device, and more particularly to a folding device applied to a baby carriage that can prevent hands from being pinched.

2. Description of Related Art

With reference to FIG. 9, a conventional baby carriage 90 has a main frame 91, a folding joint 92, and a collapsible pole 93. The main frame 91 has a supporting pole 911 with an upper end. The folding joint 92 is mounted at the upper end of the supporting pole 911. The collapsible pole 93 is pivotally mounted on the folding joint 92. When the collapsible pole 93 is folded, an inner structure of the folding joint 92 is exposed. Children might insert their fingers into the inner structure of the folding joint 92. Their fingers might get stuck in the folding joint 92 or pinched by the collapsible pole 93. The conventional baby carriage 90 has a risk of pinching children's fingers and causing severe injury.

To overcome the shortcomings of the conventional baby carriage, the present invention provides a folding device for a baby carriage to mitigate or obviate the aforementioned problems.

SUMMARY OF THE INVENTION

The main objective of the present invention is to provide a folding device for a baby carriage that can prevent children's fingers from being accidentally pinched.

The folding device comprises a supporting pole, a folding joint, and a collapsible pole. The supporting pole has two opposite ends. The folding joint is arranged at the supporting pole. The collapsible pole is rotatably mounted on the folding joint. The folding joint has an assembling seat disposed at one of the two opposite ends of the supporting pole and a blocking blade movably mounted in the assembling seat. The collapsible pole has a plug mounted in the plugging hole to prevent the collapsible pole from spinning. When the plug moves out of the plugging hole, the blocking blade can block the plugging hole. The folding device for a baby carriage in accordance with the present invention can prevent children inserting their fingers into the plugging hole and accidentally pinching their fingers.

Other objects, advantages, and novel features of the invention will become more apparent from the following detailed description when taken in conjunction with the accompanying drawings.

DETAILED DESCRIPTION OF PREFERRED EMBODIMENT

Figure 1:
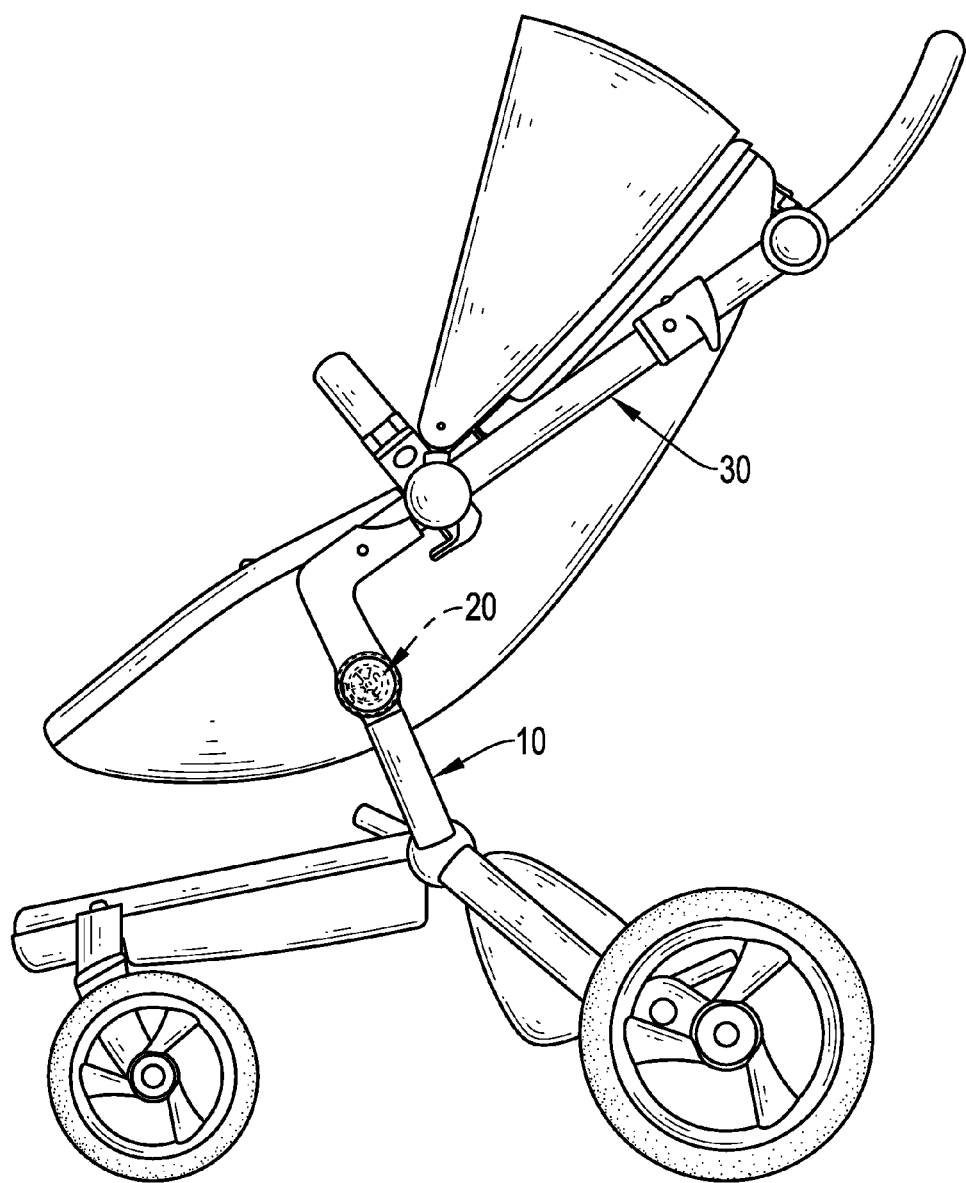
FIG. 1 is a perspective view of a baby carriage with a folding device in accordance with the present invention.
Figure 2:
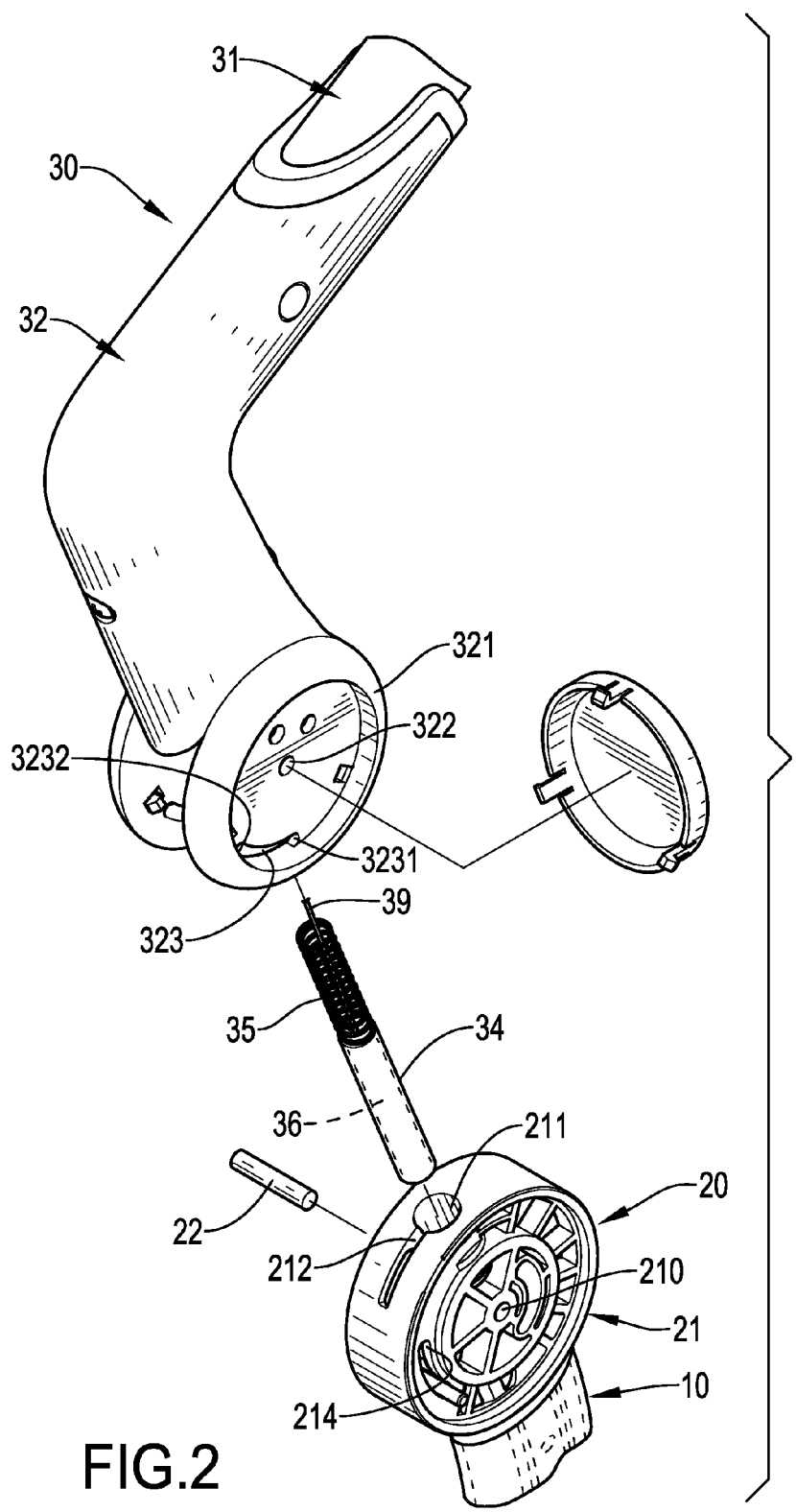
FIG. 2 is a partially exploded perspective view of the folding device in FIG. 1.

With reference to FIGS. 1 and 2, a folding device for a baby carriage in accordance with the present invention comprises a supporting pole 10, a folding joint 20, and a collapsible pole 30. The supporting pole 10 has two opposite ends. One of the two opposite ends of the supporting pole 10 is connected to a main frame of a baby carriage. The folding joint 20 is arranged on the supporting pole 10. The collapsible pole 30 is mounted on the folding joint 20.

Figure 3:
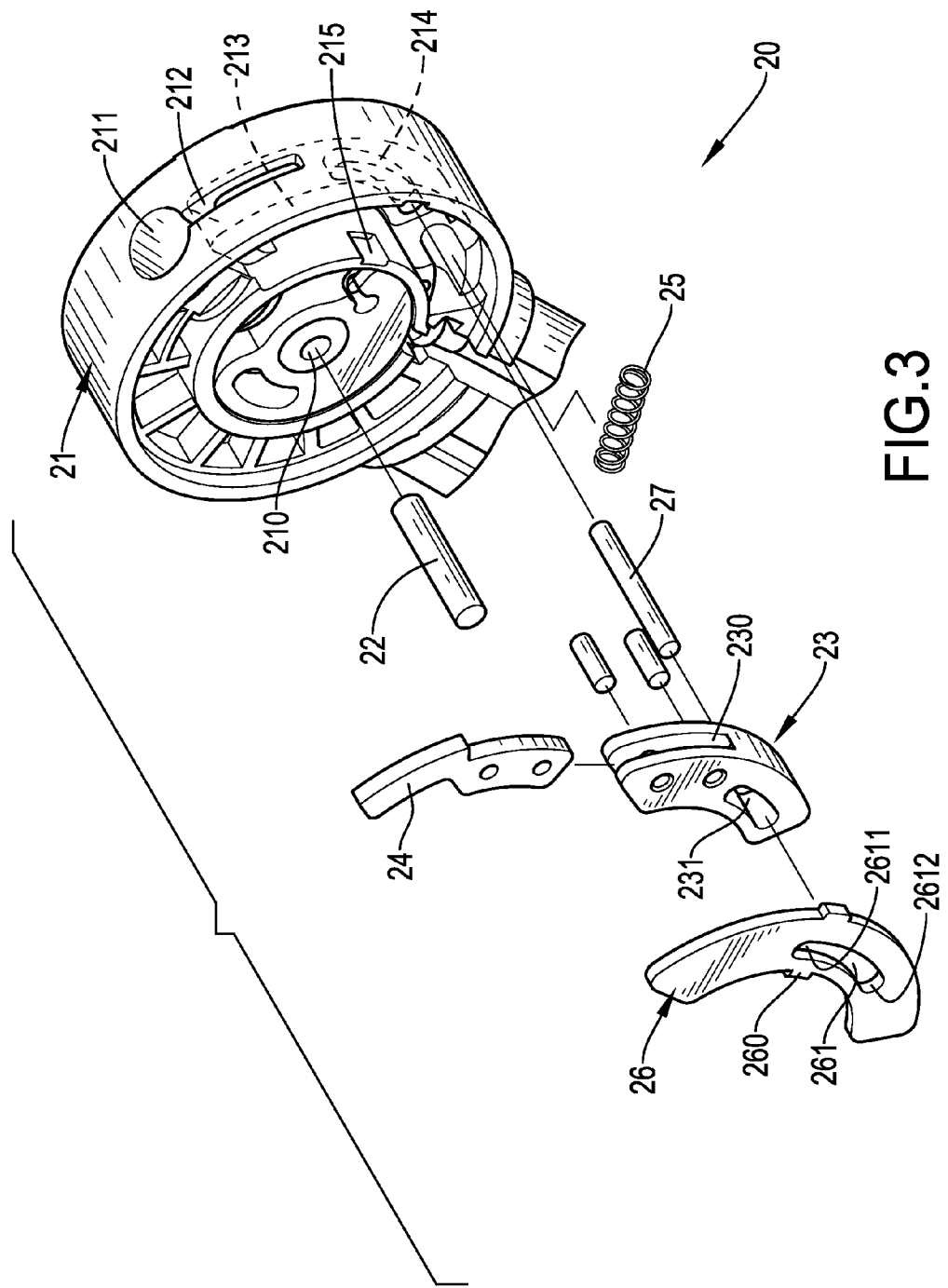
FIG. 3 is another partially exploded perspective view of the folding device in FIG. 1.
Figure 4:
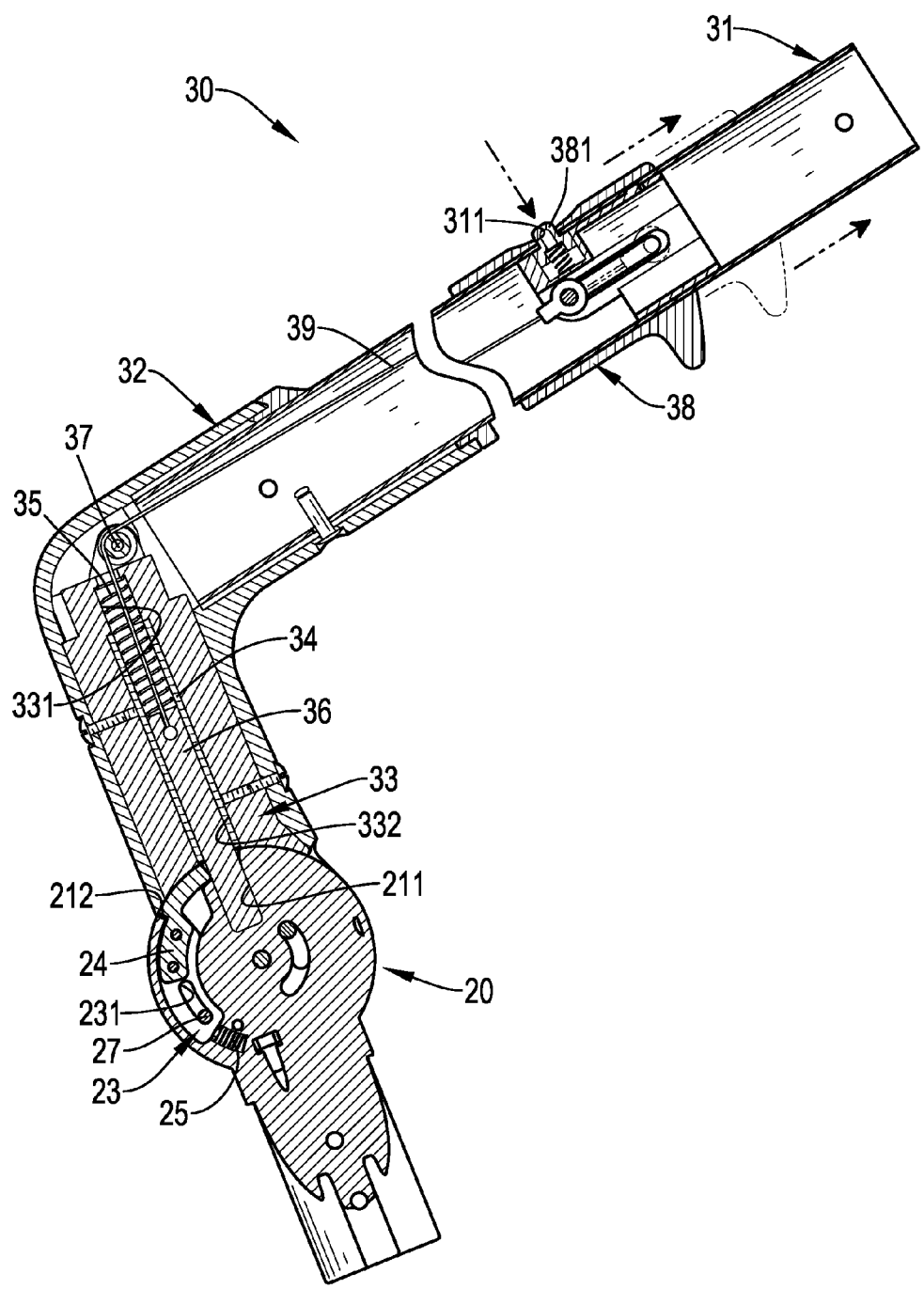
FIG. 4 is an operational side view in partial section of the folding device in FIG. 1.

With reference to FIGS. 2, 3 and 4, the folding joint 20 has an assembling seat 21, a central shaft 22, a sliding block 23, a blocking blade 24, an elastic unit 25, a limiting unit 26, and a limiting pin 27. The assembling seat 21 may be mounted or be integrally formed at the upper end of the supporting pole 10. The assembling seat 21 is circular in section and has an axial direction, a lateral direction parallel to the axial direction, a peripheral surface, two opposite sides, a central hole 210, a plugging hole 211, a guiding slit 212, a receiving recess 213, a guiding hole 214, and two engaging notches 215. The term "lateral" in the specification and claims means a direction that is parallel to the axial direction of the seat 21. The central hole 210 is axially defined in the assembling seat 21. The plugging hole 211 and the supporting pole 10 are diametrically opposite to each other with respect to the folding joint 20. The plugging hole 211 is radially defined in the peripheral surface of the assembling seat 21. The guiding slit 212 is radially defined in the peripheral surface of the assembling seat 21 and has two opposite ends. One of the two opposite ends of the guiding slit 212 communicates with the plugging hole 211. The receiving recess 213 is laterally defined in one of the two opposite sides of the assembling seat 21 and communicates with the plugging hole 211 and the guiding slit 212. The receiving recess 213 is curved and has a bottom and an inner surface. The guiding hole 214 is laterally defined in the bottom of the receiving recess 213 and is curved. The two engaging notches 215 are defined in the inner surface of the receiving recess 213 and face to each other.

With reference to FIGS. 3 and 4, the central shaft 22 is mounted in the central hole 210 of the assembling seat 21 and has two opposite ends. The sliding block 23 is movably mounted in the receiving recess 213 and has a first end, a second end, a surrounding surface, an assembling slit 230, and a curved hole 231. The first end of the sliding block 23 faces to the plugging hole 211. The second end of the sliding block 23 is opposite the first end of the sliding block 23. The assembling slit 230 is disposed at the first end of the sliding block 23 and is defined in the surrounding surface of the sliding block 23. The curved hole 231 is adjacent to the second end of the sliding block 23. The curved hole 231 is laterally defined through the sliding block 23 and has an inner surface. The curved hole 231 aligns and communicates with the guiding hole 214. The blocking blade 24 is mounted in the guiding slit 212 and is assembled in the assembling slit 230 of the sliding block 23. The blocking blade 24 and the sliding block 23 are laterally penetrated by two fastening pins and are connected to each other. The elastic unit 25 is mounted in the receiving recess 213. The elastic unit 25 is a compression spring and has two opposite ends. One of the two opposite ends of the elastic unit 25 abuts against the receiving recess 213. The other end of the elastic unit 25 abuts against the second end of the sliding block 23 and provides the sliding block 23 with a force toward the plugging hole 211 to move the sliding block 23 toward the plugging hole 211.

With reference to FIGS. 2, 3 and 4, the limiting unit 26 is mounted in the receiving recess 213 of the assembling seat 21. The limiting unit 26 is curved and has two opposite sides, two engaging protrusions 260, and a limiting hole 261. The two engaging protrusions 260 are respectively formed on the two opposite sides of the limiting unit 26 and respectively engage with the two engaging notches 215 of the assembling seat 21. The limiting hole 261 is laterally defined through the limiting unit 26 and has a first limiting end 2611 and a second limiting end 2612. The first limiting end 2611 faces to the plugging hole 211 of the assembling seat 21. The second limiting end 2612 is opposite the first limiting end 2611 and faces to the supporting pole 10. The limiting pin 27 is mounted through the guiding hole 214 of the assembling seat 21, the curved hole 231 of the sliding block 23, and the limiting hole 261 of the limiting unit 26. The limiting pin 27 has two opposite ends.

With reference to FIGS. 2 and 4, the collapsible pole 30 is mounted on the folding joint 20 and has a pole body 31, a pivoting cover 32, an assembling block 33, a tube 34, a compression spring 35, a plug 36, a guiding roller 37, a controlling unit 38, and a pulling wire 39. The pole body 31 has a peripheral surface, two opposite ends, and a through hole 311 defined in the peripheral surface of the pole body 31.

With reference to FIGS. 2 and 4, the pivoting cover 32 is disposed at one of the two opposite ends of the pole body 31. The pivoting cover 32 may be mounted around one of the two opposite ends of the pole body 31 or may be integrally formed at one of the two opposite ends of the pole body 31. The pivoting cover 32 is rotatably mounted on the assembling seat 21. The pivoting cover 32 is bent and has a bent portion, two assembling segments 321, two mounting holes 322, and two driving holes 323. The two assembling segments 321 are spaced from each other. The two assembling segments are away from the pole body 31 and are respectively disposed on the two opposite sides of the assembling seat 21. The two mounting holes 322 are respectively and axially defined through the two assembling segments 321. The two mounting holes 322 are respectively disposed around the two opposite ends of the central shaft 22. The two driving holes 323 are curved. The two driving holes 323 are respectively and laterally defined through the two assembling segments 321. The two driving holes 323 are respectively disposed around the two opposite ends of the limiting pin 27. Each driving hole 323 has a limiting end 3231 and a driving end 3232. The limiting end 3231 of the driving hole 323 is away from the pole body 31. The driving end 3232 of the driving hole 323 is opposite the limiting end 3231 of the driving hole 323. The two driving ends 3232 of the two driving holes 323 selectively abut against the limiting pin 27.

With reference to FIGS. 2 and 4, the assembling block 33 is mounted inside the pivoting cover 32. The assembling block 33 has a containing hole 331 and an inserting hole 332. The containing hole 331 is defined in the assembling block 33. The containing hole 331 has a diameter and a bottom. The inserting hole 332 is defined in the assembling block 33 and has a diameter that is larger than the diameter of the containing hole 331. The inserting hole 332 axially communicates with the containing hole 331. The tube 34 is mounted in the inserting hole 332. The compression spring 35 is mounted in the containing hole 331 and has two opposite ends. One of the two opposite ends of the compression spring 35 abuts against the bottom of the containing hole 331. The other end of the compression spring 35 is received in the tube 34. The plug 36 is mounted in the tube 34 and has a first end and a second end opposite the first end of the plug 36. The first end of the plug 36 abuts against the compression spring 35. The second end of the plug 36 is mounted inside the plugging hole 211 of the assembling seat 21.

With reference to FIGS. 2 and 4, the guiding roller 37 is assembled inside the bent portion of the pivoting cover 32. The controlling unit 38 is movably mounted on the pole body 31 and is away from the pivoting cover 32. The controlling unit 38 has a button 381 that is abutted by a compression spring 35 and protrudes from the through hole 311 of the pole body 31. The pulling wire 39 has two opposite ends. One of the two opposite ends of the pulling wire 39 is connected to the controlling unit 38. The other end of the pulling wire 39 is mounted around the guiding roller 37 and is connected to the first end of the plug 36.

Figure 5:
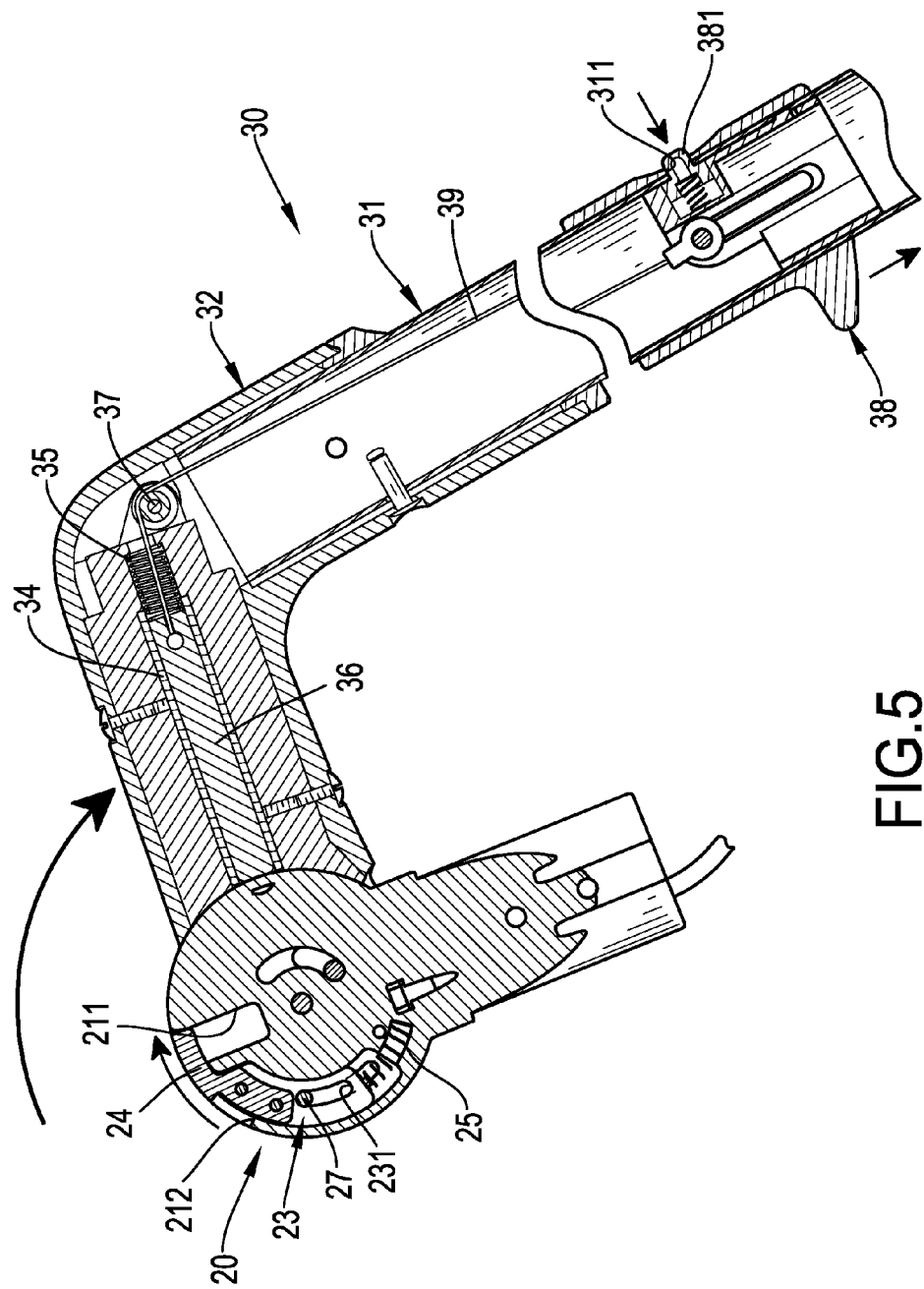
FIG. 5 is another operational side view in partial section of the folding device in FIG. 1.
Figure 6:
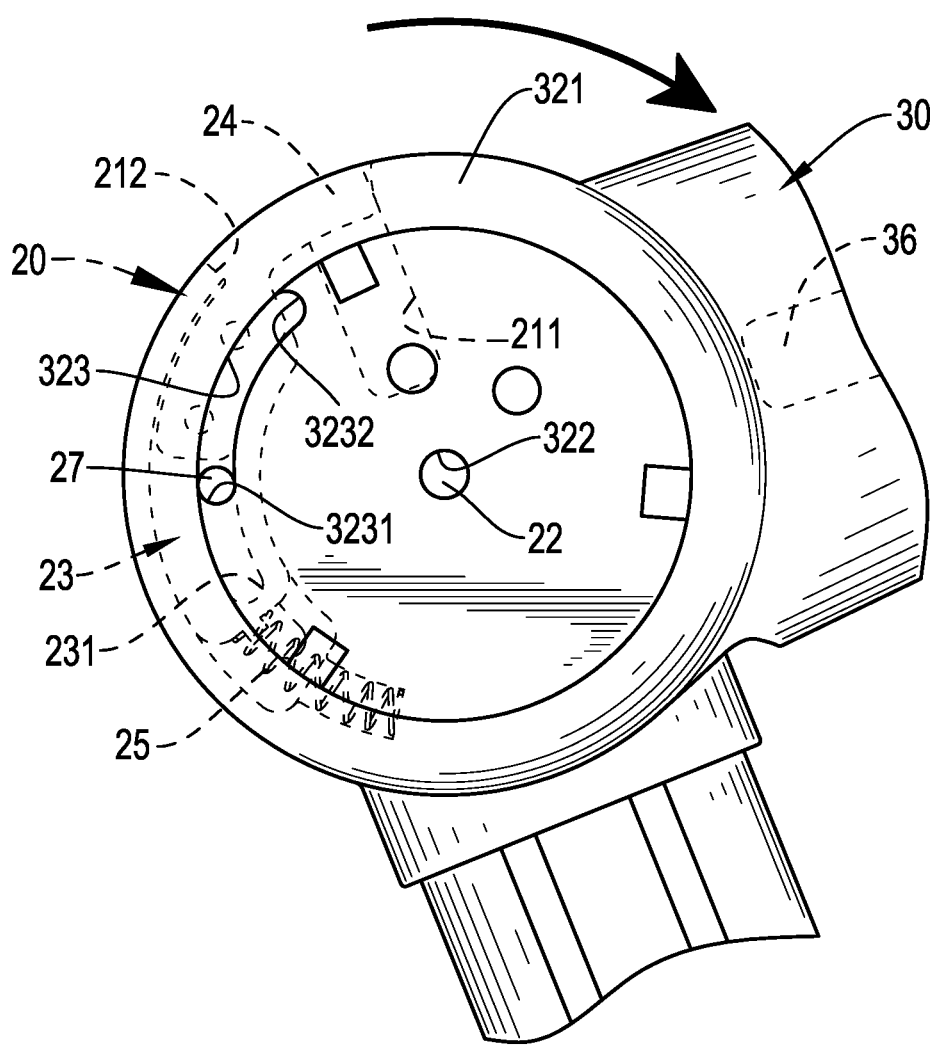
FIG. 6 is an operational side view of the folding device in FIG. 1.

With reference to FIGS. 2, 4, and 5, to press the button 381 of the controlling unit 38 and to pull the controlling unit 38 away from the pivoting cover 32, the controlling unit 38 pulls the plug 36 by the pulling wire 39. The plug 36 is pulled by the pulling wire 39 and is out of the plugging hole 211 of the assembling seat 21. The compression spring 35 is compressed by the plug 36. Then the collapsible pole 30 is able to rotate clockwise to be folded. The two driving ends 3232 of the two driving holes 323 move away from the limiting pin 27.

Meanwhile, the sliding block 23 is pressed by the elastic unit 25. The limiting pin 27 is pressed by the inner surface of the curved hole 231 of the sliding block 23. The limiting pin 27 moves clockwise toward the first limiting end 2611 of the limiting hole 261 of the limiting unit 26. Then the limiting pin 27 is blocked by the limiting end 2611 of the limiting hole 261. The sliding block 23 continually moves toward the plugging hole 211. Finally, the blocking blade 24 connected to the sliding block 23 moves inside the plugging hole 211 and can prevent children inserting their fingers into the plugging hole 211.

With reference to FIGS. 2, 4, 5, and 6, while the folding device is in the folded status, the two limiting ends 3231 of the two driving holes 323 of the pivoting cover 32 abut against the limiting pin 27. The limiting pin 27 abutted against by the two limiting ends 3231 can prevent the sliding block 23 from moving toward the supporting pole 10 along the receiving recess 213 and avoid the plugging hole 211 exposing unintentionally.

Figure 7:
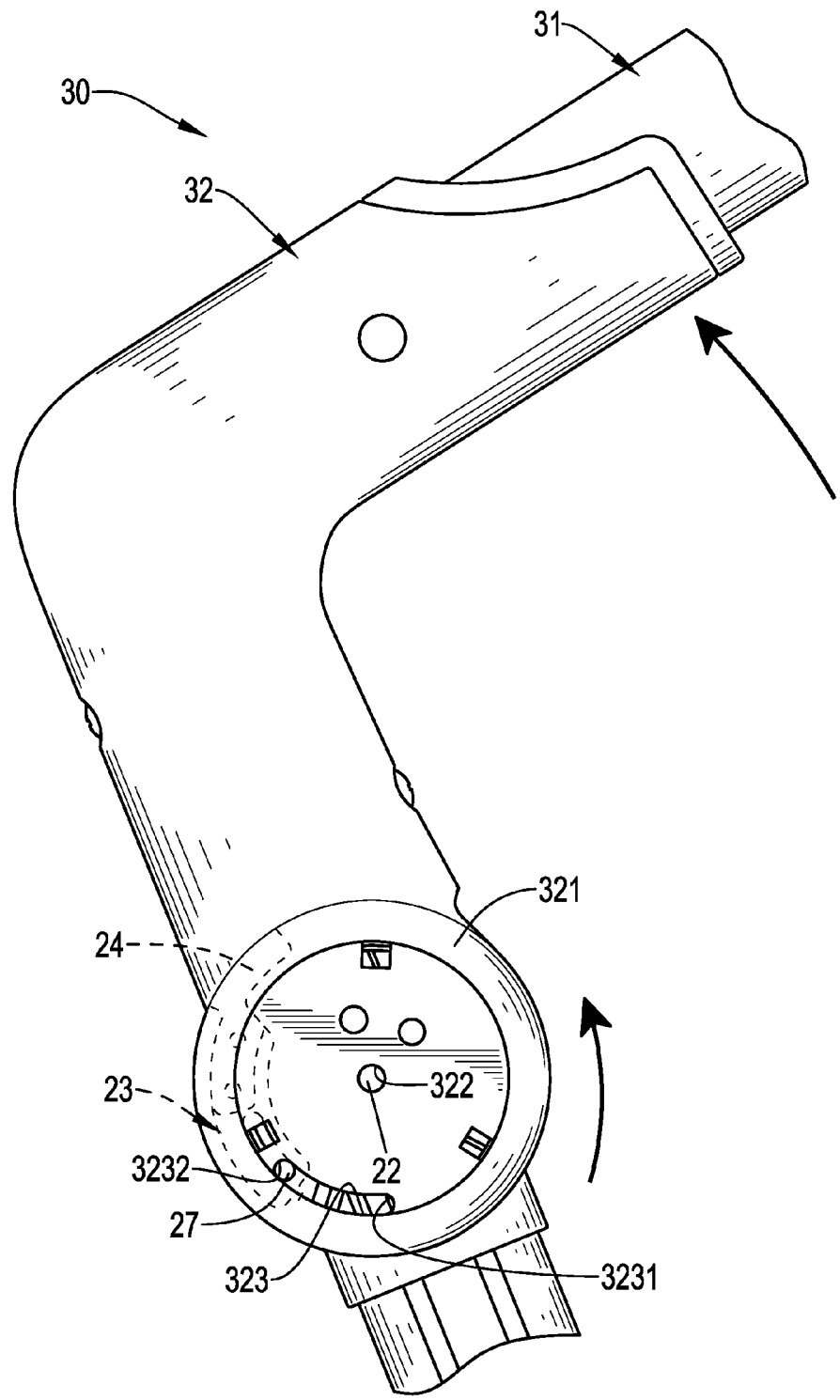
FIG. 7 is an operational side view of the folding device in FIG. 5, shown expanded.
Figure 8:
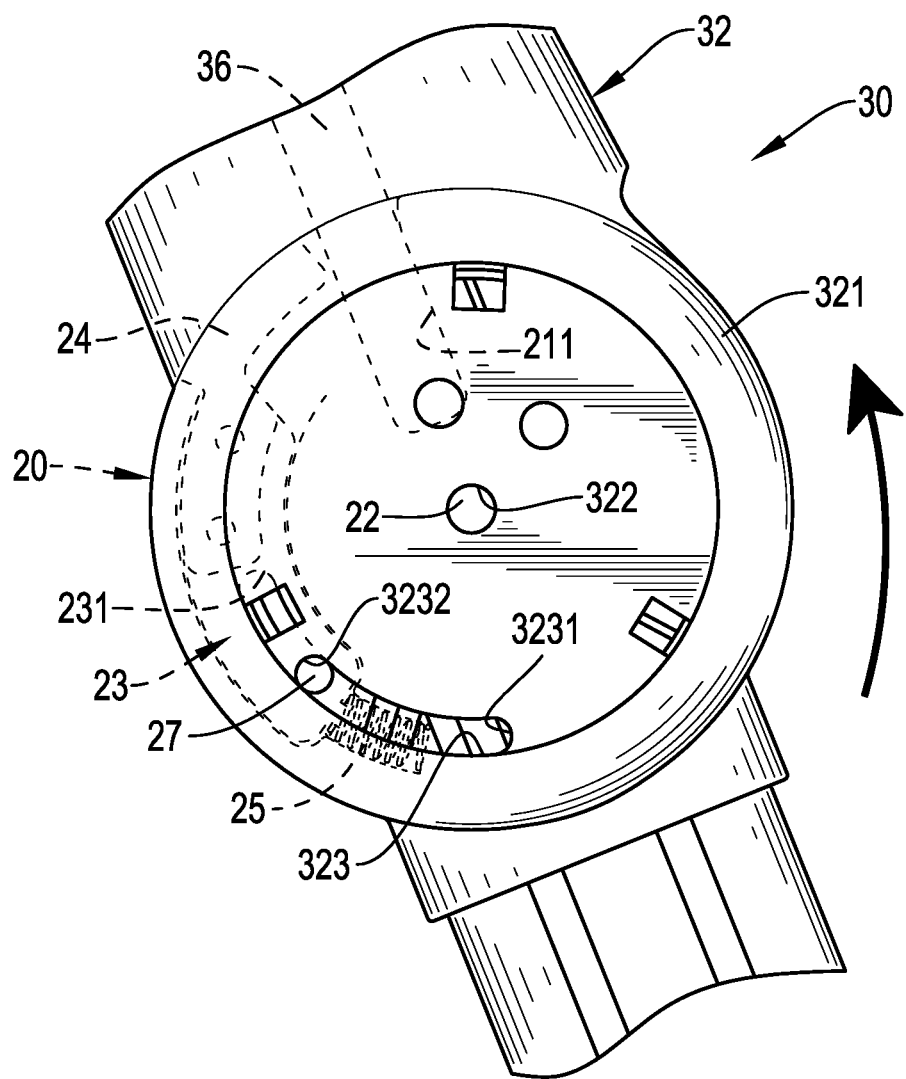
FIG. 8 is an enlarged operational side view of the folding device in FIG. 5, shown expanded.
Figure 9:
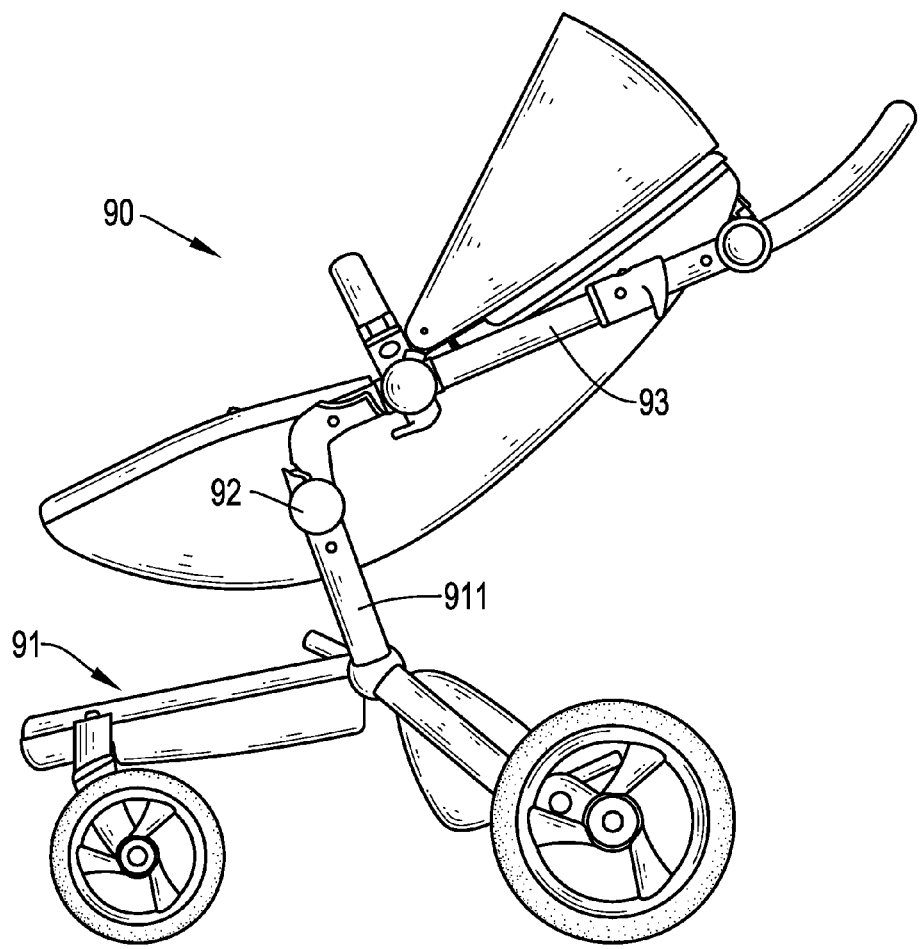
FIG. 9 is a side view of a conventional baby carriage.

With reference to FIGS. 7 and 8, to expand the folding device, the collapsible pole 30 is rotated counterclockwise. The two driving ends 3232 of the two driving holes 323 of the pivoting cover 32 push the limiting pin 27 to move along the guiding hole 214 of the assembling seat 21. The limiting pin 27 abuts against the inner surface of the curved hole 231 of the sliding block 23. The sliding block 23 moves along the receiving recess 213 and compresses the elastic unit 25. The blocking blade 24 moves out of the plugging hole 211. The plug 36 is pressed by the compression spring 35 and moves into the plugging hole 211 again.

The blocking blade 24 moving along the guiding slit 212 can block the plugging hole 211. The folding device for a baby carriage in accordance with the present invention can prevent children inserting their fingers into the plugging hole 211 and accidentally pinching their fingers.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding device comprising:
   a supporting pole having two opposite ends;
   a folding joint arranged on the supporting pole and having
   an assembling seat disposed at one of the two opposite ends of the supporting pole and having
   an axial direction;
   two opposite sides;
   a peripheral surface;
   a plugging hole radially defined in the peripheral surface of the assembling seat, the plugging hole and the supporting pole being diametrically opposite to each other with respect to the folding joint;
   a guiding slit radially defined in the peripheral surface of the assembling seat and having two opposite ends, one of the two opposite ends of the guiding slit communicating with the plugging hole;
   a receiving recess being curved, laterally defined in one of the two opposite sides of the assembling seat, communicating with the plugging hole and the guiding slit, and having a bottom;
   a guiding hole being curved and laterally defined in the bottom of the receiving recess;
   a sliding block movably mounted in the receiving recess and having
   a first end facing to the plugging hole;
   a second end opposite the first end of the sliding block; and
   a curved hole laterally defined through the sliding block and aligning and communicating with the guiding hole;
   a blocking blade mounted in the guiding slit and connected to the first end of the sliding block;
   an elastic unit mounted in the receiving recess and having two opposite ends, one of the two opposite ends of the elastic unit abutting against the receiving recess, the other end of the elastic unit abutting against the second end of the sliding block; and
   a limiting pin mounted through the curved hole of the sliding block and the guiding hole of the assembling seat; and
   a collapsible pole mounted on the folding joint and having
   a pole body having two opposite ends;
   a pivoting cover disposed at one of the two opposite ends of the pole body, rotatably mounted on the assembling seat, and having
   at least one driving hole being curved, defined through the pivoting cover, disposed around the limiting pin, and each one of the at least one driving hole having
   a limiting end away from the pole body; and
   a driving end opposite the limiting end and selectively abutting against the limiting pin;
   a plug assembled inside the pivoting cover and having
   a first end; and
   a second end opposite the first end of the plug and selectively mounted inside the plugging hole;
   a controlling unit movably mounted on the pole body and being away from the pivoting cover; and
   a pulling wire having two opposite ends, one of the two opposite ends of the pulling wire connected to the controlling unit, the other end of the pulling wire connected to the first end of the plug.

2. The folding device as claimed in claim 1, wherein the folding joint has
   a limiting unit mounted in the receiving recess and having
   a limiting hole laterally defined through the limiting unit and disposed around the limiting pin.

3. The folding device as claimed in claim 2, wherein the receiving recess has
   an inner surface; and
   two engaging notches defined in the inner surface of the receiving recess and facing to each other; and
   the limiting unit has
   two opposite sides; and
   two engaging protrusions respectively formed on the two opposite sides of the limiting unit and respectively engaging with the two engaging notches.

4. The folding device as claimed in claim 3, wherein the sliding block has
   an assembling slit defined in the first end of the sliding block;
   the blocking blade is assembled in the assembling slit; and
   the blocking blade and the sliding block are penetrated by two fastening pins and are connected to each other.

5. The folding device as claimed in claim 4, wherein the pivoting cover is bent and has a bent portion;
   the collapsible pole has a guiding roller assembled inside the bent portion of the pivoting cover; and
   the pulling wire is mounted around the guiding roller.

6. The folding device as claimed in claim 5, wherein the pole body has
   a peripheral surface; and
   a through hole defined in the peripheral surface of the pole body; and
   the controlling unit has a button subjected by an elastic force and protruding from the through hole of the pole body.

7. The folding device as claimed in claim 6, wherein the collapsible pole has
   a tube mounted inside the pivoting cover, wherein the plug is mounted in the tube;
   a compression spring mounted inside the pivoting cover and having two opposite ends, one of the two opposite ends of the compression spring received in the tube and abutting the plug to provide a force to insert the plug into the plugging hole; and
   the plug is mounted in the tube, and the first end of the plug abuts against the compression spring.

8. The folding device as claimed in claim 7, wherein the collapsible pole has an assembling block mounted inside the pivoting cover and having
   a containing hole defined in the assembling block and having a bottom; and
   an inserting hole defined in the assembling block and axially communicating with the containing hole;
   the tube is mounted in the inserting hole; and
   the compression spring is mounted in the containing hole, and the other end of the compression spring that is away from the plug abuts against the bottom of the containing hole.

9. The folding device as claimed in claim 8, wherein
the folding joint has a central shaft;
the assembling seat has a central hole axially defined in the assembling seat; and
the central shaft is mounted in the central hole.

\* \* \* \* \*